United States Patent [19]
McEowen

[11] 4,087,188
[45] May 2, 1978

[54] PIVOT JOINT HOUSING

[76] Inventor: Victor R. McEowen, 379 Pittsfield Dr., Worthington, Ohio 43085

[21] Appl. No.: 663,237

[22] Filed: Mar. 3, 1976

[51] Int. Cl.² ............................................. F16C 11/06
[52] U.S. Cl. .............................. 403/138; 29/149.5 B; 403/404
[58] Field of Search ................. 403/122, 138, 135, 42, 403/404; 29/149.5 B

[56] References Cited

U.S. PATENT DOCUMENTS

| Re. 27,778 | 10/1973 | Potter et al. ............. 29/149.5 B X |
| 2,419,691 | 4/1947 | Shafer ............................ 403/42 |
| 2,553,337 | 5/1951 | Shafer ........................ 403/362 X |
| 2,733,085 | 1/1956 | Latzen ......................... 403/135 X |
| 2,733,086 | 1/1956 | Latzen ............................. 403/135 |
| 2,857,656 | 10/1958 | Straub ......................... 29/149.5 B |

FOREIGN PATENT DOCUMENTS

| 849,629 | 9/1952 | Germany ........................ 403/135 |
| 796,706 | 6/1958 | United Kingdom ............. 403/138 |

*Primary Examiner*—Andrew V. Kundrat

[57] ABSTRACT

A housing for flexible joints such as are used in automotive steering linkages or the like wherein each housing is provided with an integral internal spherical bearing surface formed during the forging and inner cavity machining operations, with such housings being characterized by precisely localized hardened annular zones at the spherical bearing surfaces.

3 Claims, 8 Drawing Figures

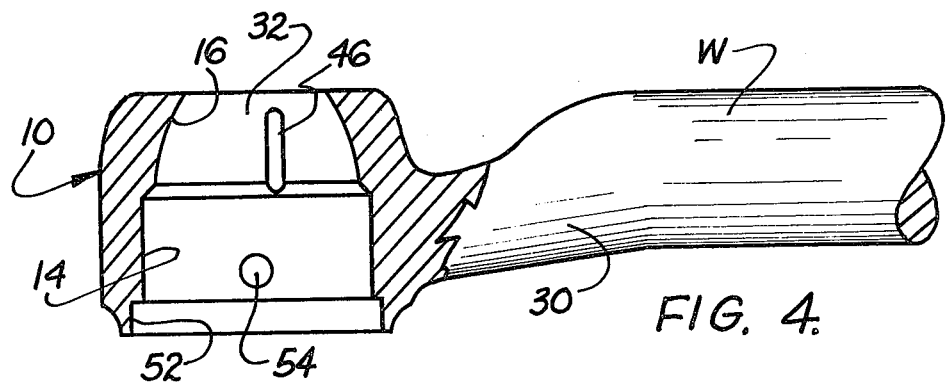
FIG. 4.
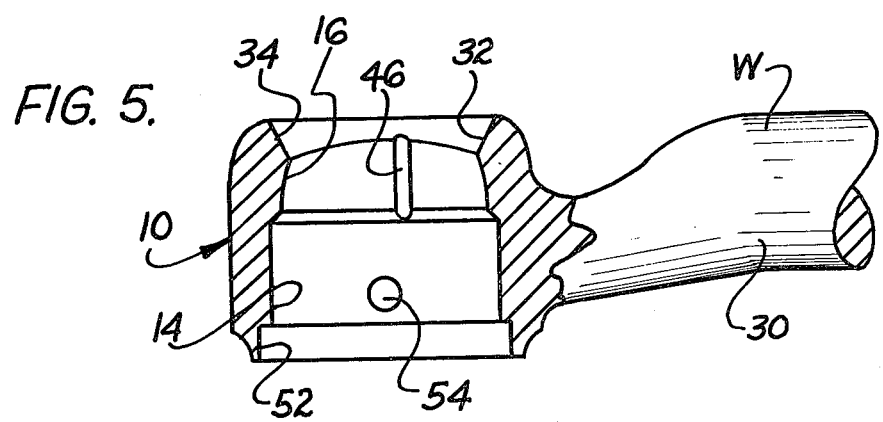
FIG. 5.
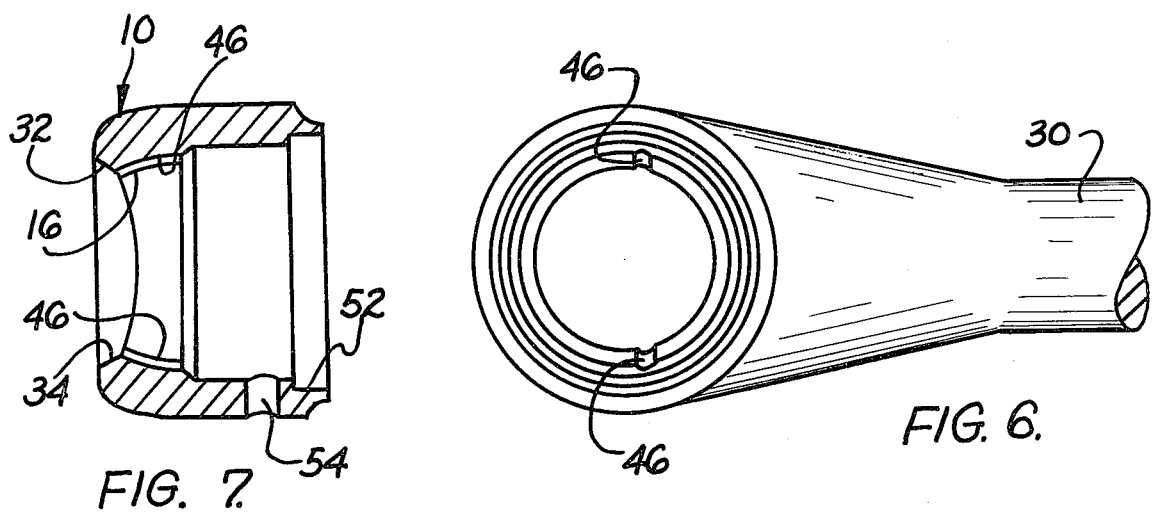
FIG. 7.
FIG. 6.

PIVOT JOINT HOUSING

BACKGROUND OF THE INVENTION

This invention relates generally to flexible joints and more particularly to a new and improved housing and bearing construction for ball joints such as are used in automotive steering linkages or the like.

PROBLEMS IN THE ART

It is presently the practice in the art to fabricate ball joints from forged housings provided with separate internal spherical bearing inserts for supporting the male ball studs. In many instances the spherical bearing inserts have been formed of synthetic resinous materials but a problem has been present in that such plastic bearing materials have been lacking in longevity under high stress operating conditions, particularly when operated in high temperature environments. Operation of automotive pivot joints in hot environments has only recently been dictated by the required polution control devices added within the hood shells of the engine compartments.

In an effort to offset the high temperature environment problems, pivot joints have recently been fabricated with spherical bearings formed of annular metal inserts which overcome the heat problem but which require highly accurate machining operations both with respect to the fabrication of the metal inserts and the required annular seat supporting surface which must be accurately located and formed in the housing.

SUMMARY OF THE INVENTION

In general, the present invention comprises a novel pivot joint housing and bearing construction which can be fabricated at high rates of production with such housings including integrally formed spherical bearing surfaces which surfaces are located and shaped simultaneously with the forging and internal machining of the housings, and by the formation of a localized annular hardened zone at the spherical bearing surface.

The localized hardened bearing zones are formed by an induction heating step precisely performed on the housing after the above mentioned forging and machining steps, and by a subsequent quenching whereby cooling fluid is precisely applied to the housing so as to maintain localization of the induction heating to a predetermined annular zone at the bearing surface. As a result, the metal in the balance of the housing remains non-hardened, tough, and fatigue resistant so as to be metallurgically proper for the main housing material.

As another aspect of the present invention, the novel pivot joint housing construction includes lubrication grooves in the spherical bearing surface which form grease reservoirs in the bearing surface without the presence of aberrations in the finished bearing surface.

As still another aspect of the present invention the above mentioned lubrication grooves are asymmetrically located with respect to the spherical bearing surface to prevent machine tool chatter during the final machining of the surface.

It is, therefore, an object of the present invention to provide an improved pivot joint housing construction which includes an integral spherical bearing surface surrounded by a localized hardened zone of high wear resistance, with the metal of the remainder of the housing portion being unhardened and metallurgically proper for a high degree of strength and fatigue resistance.

It is another object of the present invention to provide a pivot joint housing of the type described adapted for fabrication at high production rates by an inductor electrode and quenching apparatus which are repeatedly locatable with respect to precise portions of the housing workpieces.

It is still another object of the present invention to provide a novel pivot joint housing construction provided with integral hardened spherical bearing surfaces that include lubrication grooves located in the bearing surfaces without the presence of spherical aberrations adjacent the grooves.

Further objects and advantages of the present invention will be apparent from the following description, reference being had to the accompanying drawings wherein a preferred form of embodiment of the invention is clearly shown.

BRIEF DESCRIPTION OF THE DRAWINGS

FIGS. 3 through 5 are side elevational views, partially in section, of the workpiece of FIG. 2 in various steps of formation;

FIG. 6 is a bottom elevational view of the workpiece corresponding to FIG. 5;

FIG. 7 is an end sectional view of the workpiece of the preceding figures; and

DESCRIPTION OF THE PREFERRED EMBODIMENT

Figure 1:
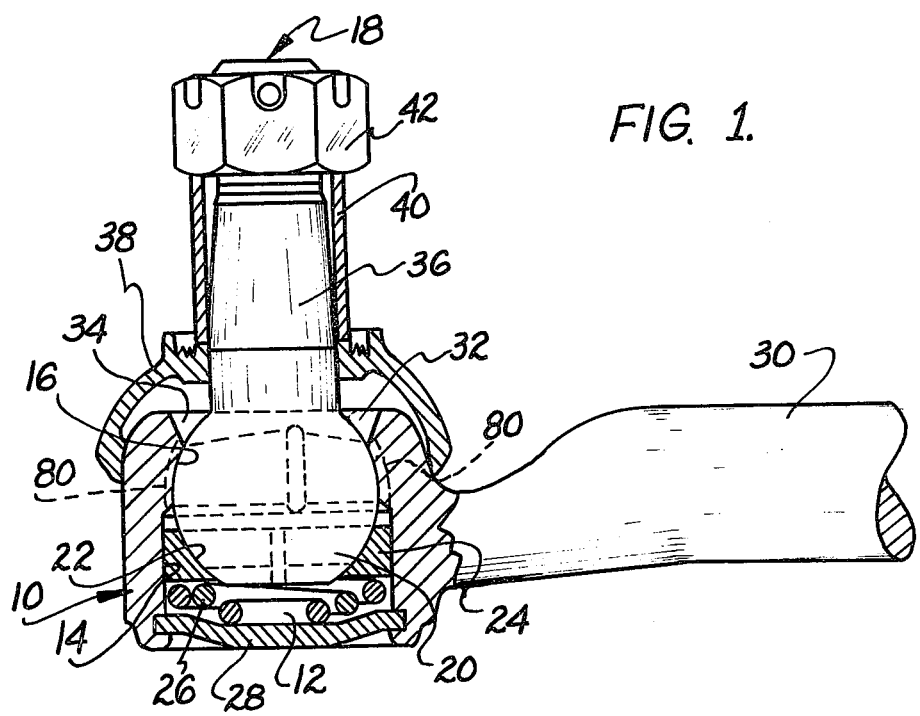
FIG. 1 is a side sectional view of a ball joint including a housing constructed in accordance with the present invention.

Referring in detail to the drawings, FIG. 1 illustrates a typical pivot joint including a housing constructed in accordance with the present invention, with such housing being indicated generally at 10. The housing includes a cavity 12 that includes an inner wall surface 14 and a spherical bearing surface 16.

With continued reference to FIG. 1, a ball stud is indicated generally at 10. The housing includes a cavity 12 that includes an inner wall surface 14 and a spherical bearing surface 16.

With continued reference to FIG. 1, a ball stud indicated generally at 18 includes a ball shaped end 20 which is pivotally supported by bearing surface 16 as well as by a bearing surface 22 formed on a removable bearing insert 24.

Bearing insert 24 is urged inwardly by a compression spring 26 which is interposed between an end closure 28 and the bearing insert. The housing further includes a shank portion 30 as well as a top opening 32 which includes a tapered wall 34 the latter permitting angular movement of the shank 36 upon pivoting thereof.

The assembly of FIG. 1 also includes a dust cover 38, sleeve 40, and nut 42.

Figure 2:
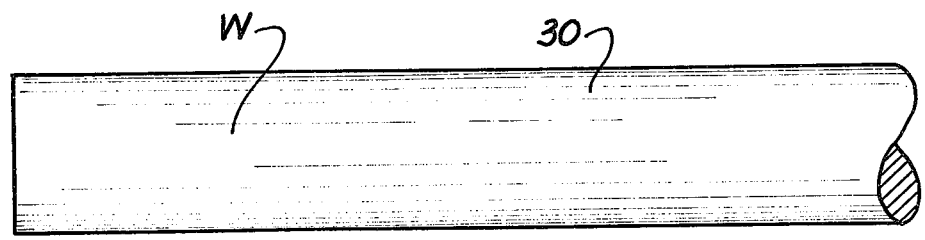
FIG. 2 is a partial side elevational view of a workpiece used in forming the housing of FIG. 1.

Referring next to FIG. 2, the above mentioned housing 10 is formed from a workpiece W which consists of a rod of carbon steel with sufficient carbon content to permit subsequent indiction hardening. A suitable steel material is referred to as the middle carbon type, such as SAE 1040.

Figure 3:
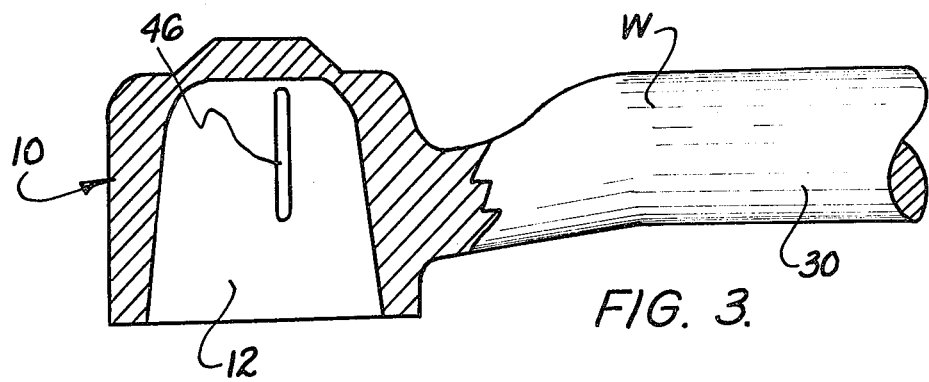

After the workpiece W has been sheared to length from bar stock, it is heated and forged to the shape shown in FIG. 3 wherein the housing 10, with the cavity 12, have been forged to the shape illustrated.

The workpiece is next subjected to a coining operation to form the grease grooves 46 with such grooves being eccentrically located so as not to be directly opposite each other as seen in FIG. 6.

It is important to mention that during the forging operation, or when forging and coining operations are performed to include the grease grooves, then the surface carbon is removed as a result of the working of the metal during the forging or forging and coining steps.

It should further be pointed out that such surface decarbonization normally would inherently preclude the subsequent induction hardening of the wall portion of the housing where the spherical bearing is to be formed.

In accordance with the present invention the workpiece W is subjected to an internal machining operation using a circular milling cutter so as to machine away the surface decarbonization and accurately locate and finally shape and finish the previously mentioned spherical bearing surface 16. Inner wall portion 14 is also machined at the same time to remove the taper left by the forging die.

A bottom hole 32 is also formed in the housing as well as a groove 52 for receiving the end closure 28. Such bottom hole 32 and groove 52 can be cut at the same time the wall surface 14 and bearing surface 16 are machined.

It should further be mentioned that during the internal machining the grease grooves 46 are cut down in length and any surface aberrations present in FIG. 3 are machined away such that the bearing curvature will be accurately produced. As still another operation, a radial hole 54 is formed through the wall of the housing for the subsequent mounting of a grease fitting.

Reference is next made to FIG. 5, which illustrates the machining of the outwardly tapered surface 34 at the opening 32. The workpiece of FIGS. 5 through 7 is next positioned over an inductor electrode assembly indicated generally at 60 which includes an induction coil 62 and induction connector 64 mounted on a suitable supporting body 66.

Figure 8:
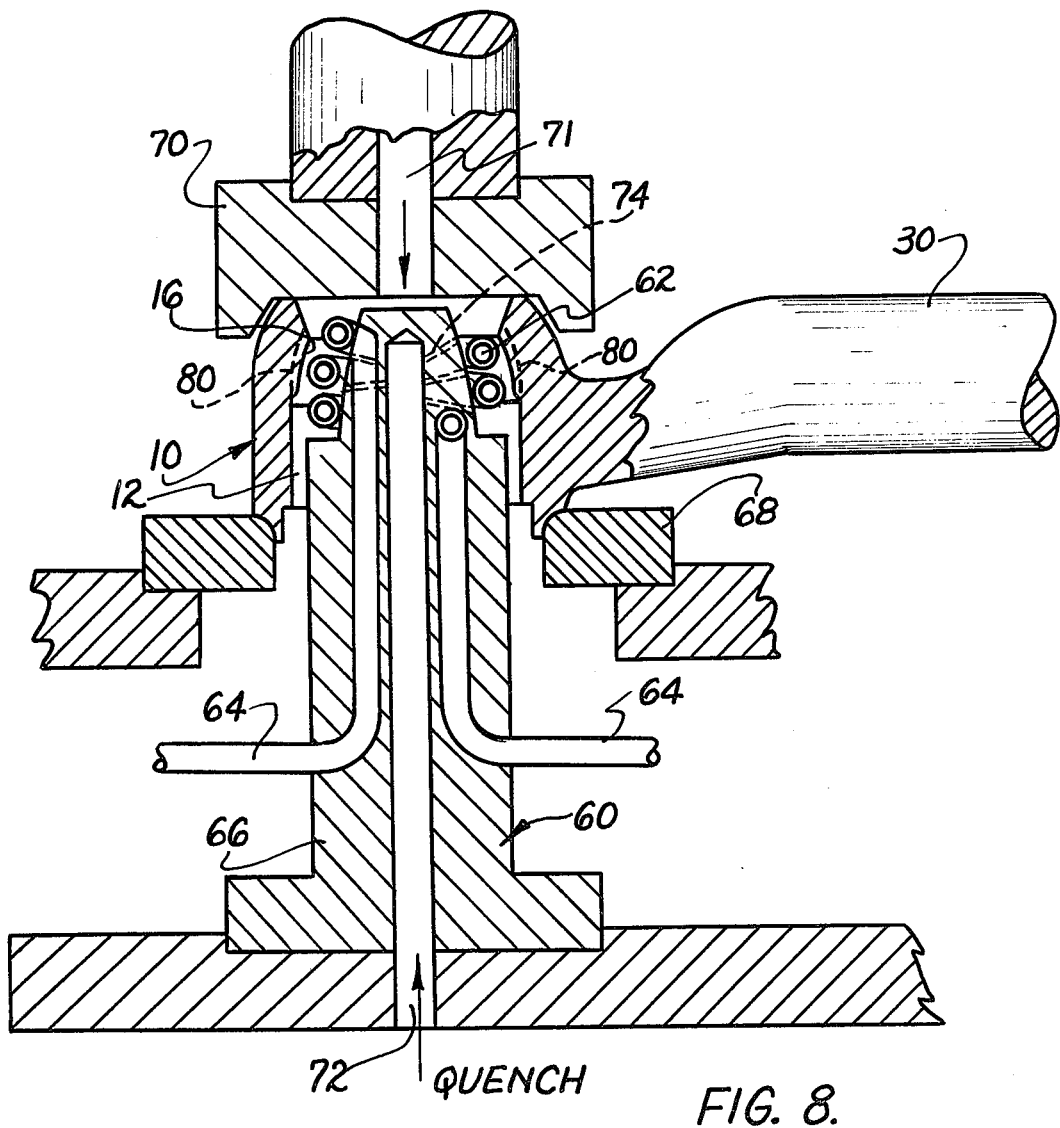
FIG. 8 is a side elevational view showing an induction heating electrode and an associated fixture for locating the workpiece of the preceding figures.

The assembly of FIG. 8 further includes a lower positioning fixture 68 for receiving and positioning the bottom of housing 10 and an upper positioning fixture 70 for engaging and positioning the top of housing 10. The upper positioning fixture 70 is provided with extending and retracting mechanism as well as a spring loaded arrangement, not illustrated.

With continued reference to FIG. 8, the lower fixture is provided with a quenching inlet conduit 72 having radially extending outlet orifices indicated by dotted delineation at 74. When a coolant fluid is admitted under pressure into quench conduit 72, it is directed outwardly through the radial orifices 74 and impinges on the bearing surface 16. An alternate way of quenching can be effected by introducing the coolant through passage 71 in upper positioning fixture 70.

In operation, having been forged and finished to the configuration of FIG. 6, housing 10 is placed in the induction heating apparatus with the top of the supporting body 66 inserted into the cavity 12 of housing 10 such that the induction coil 62 is precisely positioned in close proximity to spherical bearing surface 16. The induction coil 62 is next energized with a predetermined appropriate amount of power to induction harden spherical bearing surface 16 and to also harden the underlying zone 80 to the predetermined depth.

It has been found that by using a SAE 1040 hot rolled steel with the forged area having a Brinell hardness of 143–229, then the depth of the hardened zone 80 should be formed with a zone depth of between 0.010 and 0.090 of an inch with the preferred range being between 0.020 and 0.080. This will produce a surface hardness of between 40 and 70 Rockwell C with the preferred range being between 50 and 60 Rockwell C. This depth of surface zone has been found to be ideal for both a wear resistant bearing surface and tough fatigue resistant housing.

Further objects and advantages of the present invention will be apparent from the following description, reference being had to the accompanying drawings wherein a preferred form of embodiment of the invention is clearly shown.

What is claimed is:

1. A housing for pivot joints comprising, in combination, a cup-shaped housing portion provided by a forged carbon steel blank including a cavity provided with an inner wall, one end of said inner wall including a decarbonized spherical bearing surface integrally formed with the forging of said housing and said decarbonized spherical bearing surface having a final machined finish to remove surface metal from which carbon was removed by working of the metal during forging and said final finish also being subsequently locally hardened by induction to provide an annular controlled zone of hardened metal from the interior of said forged blank for said spherical bearing surface, and said hardened zone being of predetermined thickness with the metal of said housing surrounding said zone being relatively unhardened as compared to said zone.

2. The pivot joint housing defined in Claim 1 wherein the predetermined thickness of said hardened annular zone is between 10 and 90 thousandths of an inch.

3. The pivot joint housing defined in Claim 1 wherein said annular zone is hardened to between 40 and 70 Rockwell C.

* * * * *